US010803677B2

(12) United States Patent
Powers

(10) Patent No.: US 10,803,677 B2
(45) Date of Patent: Oct. 13, 2020

(54) METHOD AND SYSTEM OF AUTOMATED FACIAL MORPHING FOR EYEBROW HAIR AND FACE COLOR DETECTION

(71) Applicant: Mathew Powers, New York, NY (US)

(72) Inventor: Mathew Powers, New York, NY (US)

( * ) Notice: Subject to any disclaimer, the term of this patent is extended or adjusted under 35 U.S.C. 154(b) by 0 days.

(21) Appl. No.: 16/398,242

(22) Filed: Apr. 29, 2019

(65) Prior Publication Data

US 2020/0126314 A1   Apr. 23, 2020

Related U.S. Application Data

(60) Provisional application No. 62/664,271, filed on Apr. 30, 2018, provisional application No. 62/774,864, filed on Dec. 4, 2018.

(51) Int. Cl.
*G06T 19/20* (2011.01)
*G06K 9/00* (2006.01)
*G06T 5/20* (2006.01)
*G06T 11/60* (2006.01)

(52) U.S. Cl.
CPC .......... *G06T 19/20* (2013.01); *G06K 9/00248* (2013.01); *G06K 9/00281* (2013.01); *G06T 5/20* (2013.01); *G06T 11/60* (2013.01)

(58) Field of Classification Search
CPC .................. G06T 19/20; A61B 34/10; A61B 2017/00792
See application file for complete search history.

(56) References Cited

U.S. PATENT DOCUMENTS

| 2008/0192999 A1* | 8/2008 | Edgar ..................... H04N 1/628 382/128 |
| 2015/0254500 A1* | 9/2015 | Izumi ...................... G06T 11/60 348/78 |
| 2016/0135730 A1* | 5/2016 | Arai ........................ A61B 5/443 600/306 |
| 2017/0076474 A1* | 3/2017 | Fu ............................ G06T 11/00 |
| 2017/0169285 A1* | 6/2017 | Chen .................. G06K 9/00268 |

\* cited by examiner

*Primary Examiner* — Phi Hoang

(57) ABSTRACT

In one aspect, a computerized method useful for automated facial morphing for eyebrow hair and face color detection includes the step of obtaining a face image. The face image comprises a digital image of a frontal view of a user's face. The method includes the step of identifying a pair of eyebrows in the face image. The method includes the step of generating a brow-less image of the face image by removing the pair of eyebrows from the face image. The method includes the step of, with a digital image of the removed pair of eyebrows, detecting the eyebrow color. The method includes the step of creating a pixel table for an eyebrow candidate region. The method includes the step of defining the eyebrow candidate region as a set of pixels with a different color between the eyebrow color and a brow-less image color.

10 Claims, 17 Drawing Sheets

METHOD AND SYSTEM OF AUTOMATED FACIAL MORPHING FOR EYEBROW HAIR AND FACE COLOR DETECTION

CROSS-REFERENCE TO RELATED APPLICATIONS

This application claims priority to U.S. provisional patent application No. 62/664,271, titled METHOD AND SYSTEM OF AUTOMATED FACIAL MORPHING and filed on 30 Apr. 2018. This application is hereby incorporated by reference in its entirety.

This application claims priority to U.S. provisional patent application No. 62/774,864, titled METHOD AND SYSTEM OF AUTOMATED FACIAL MORPHING and filed on 4 Dec. 2018. This application is hereby incorporated by reference in its entirety.

BACKGROUND

1. Field

This application relates generally to 3D model morphing, and more particularly to a system, method and article of manufacture of automated facial morphing for eyebrow hair and face color detection.

2. Related Art

Aesthetic medicine and other cosmetic treatments are increasing in popularity. Treatments in this area can be permanent. Accordingly, patients often wish to view simulation s of the final outcome. Patients also prefer to be able select from a set of possible outcomes. Consequently, various facial morphing methods are used to provide simulated outcomes. However, these methods may use 3D model morphing and often require high-levels of computer processing power and specialized algorithms to adequately model each individual patient's face. These may only be available at a cosmetic-treatment doctor's office. However, patients may wish to try various options on their faces prior to visiting the cosmetic-treatment doctor. Accordingly, improvements to methods of automated facial morphing for eyebrow hair and face color detection are desired.

BRIEF SUMMARY OF THE INVENTION

In one aspect, a computerized method useful for automated facial morphing for eyebrow hair and face color detection includes the step of obtaining a face image. The face image comprises a digital image of a frontal view of a user's face. The method includes the step of identifying a pair of eyebrows in the face image. The method includes the step of generating a brow-less image of the face image by removing the pair of eyebrows from the face image. The method includes the step of, with a digital image of the removed pair of eyebrows, detecting the eyebrow color. The method includes the step of creating a pixel table for an eyebrow candidate region. The method includes the step of defining the eyebrow candidate region as a set of pixels with a different color between the eyebrow color and a brow-less image color. For each pixel in the set of pixels, an intensity value of the brow-less image and another intensity value of the face image is determined. A ratio of the intensity value of the brow-less image and another intensity value of the face image is calculated. The method includes the step of sorting all the ratios in a descending order and for each ratio. The ratio, the intensity value of the brow-less image and the other intensity value of the face image are written into the pixel table. An average skin color of the face image and an average eyebrow color of the face image are calculated.

BRIEF DESCRIPTION OF THE DRAWINGS

The present application can be best understood by reference to the following description taken in conjunction with the accompanying figures, in which like parts may be referred to by like numerals.

Figure 1:
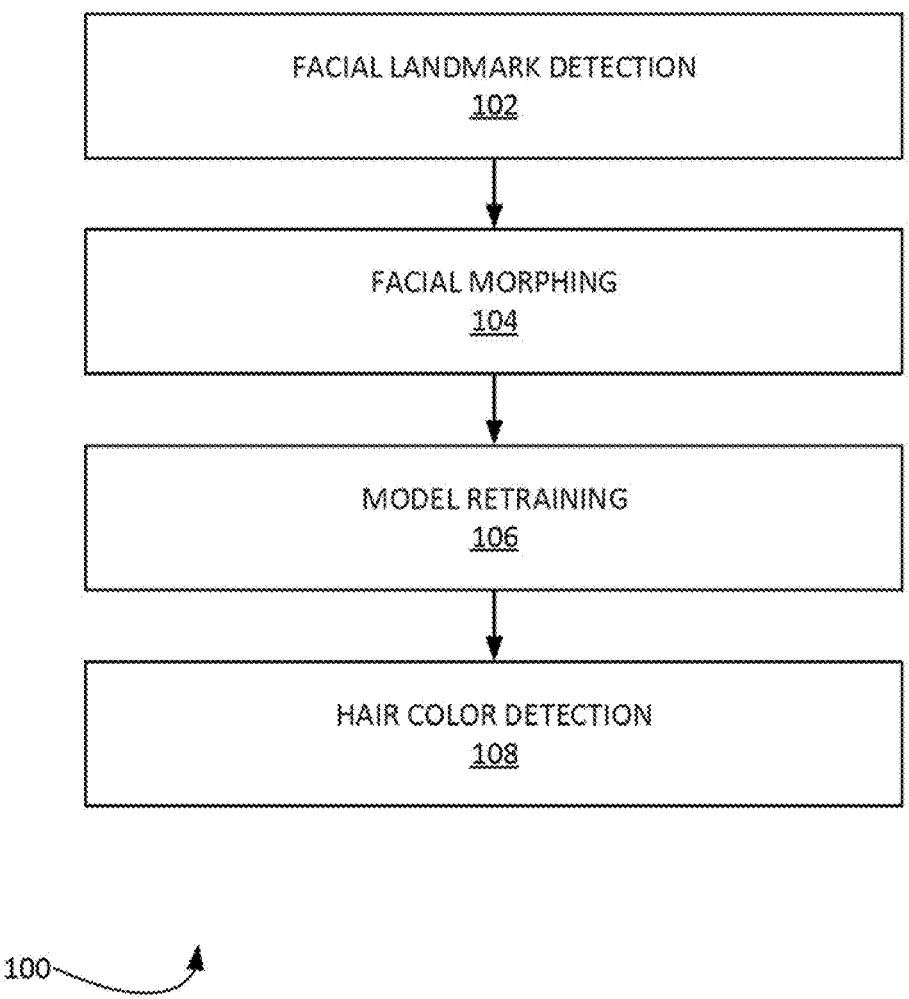
FIG. 1 schematically depicts an example process for automated facial morphing, according to some embodiments.

The Figures described above are a representative set and are not an exhaustive with respect to embodying the invention.

DESCRIPTION

Disclosed are a system, method, and article of automated facial morphing. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Computer vision is an interdisciplinary field that deals with how computers can be made for gaining high-level understanding from digital images or videos. From the perspective of engineering, it seeks to automate tasks that the human visual system can do.

Dlib is a general-purpose cross-platform software library written in the programming language C++.

Edge detection includes a variety of mathematical methods that aim at identifying points in a digital image at which the image brightness changes sharply or, more formally, has discontinuities.

Low-pass filter (LPF) is a filter that passes signals with a frequency lower than a selected cutoff frequency and attenuates signals with frequencies higher than the cutoff frequency. The exact frequency response of the filter depends on the filter design.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter glia: decision tree learning, association rule learning, artificial neural networks, inductive logic programming, support vector machines, clustering, Bayesian networks, reinforcement learning, representation learning, similarity and metric learning, and/or sparse dictionary learning.

OpenCV (Open Source Computer Vision) is a library of programming functions mainly aimed at real-time computer vision.

Open Graphics Library (OpenGL) is a cross-language, cross-platform application programming interface (API) for rendering 2D and 3D vector graphics.

3D computer graphics can be computer graphics that use a three-dimensional representation of geometric data.

Rendering or image synthesis is the automatic process of generating a photorealistic or non-photorealistic image from a 2D or 3D model (or models in what collectively could be called a scene file) by means of computer programs.

Exemplary Processes

Example embodiments of an automated facial morphing application can be used enable plastic surgery candidates to view digital renderings of images that the candidate will appear like after cosmetic surgery. The automated facial morphing application can 'automate' the candidate's experience by evaluating the candidate's face and automatically applying facial elements such as a preferred eye brow, a preferred nose, etc. It is noted that previously facial morphing system were not automated and limited to expensive systems available in a doctor's office. In contrast, the automated facial morphing application can implement this facial morphing experience to a mobile device and can be managed by the plastic surgery candidate without professional assistance. The automated facial morphing application can be used to preview facial morphing in anticipation of, inter alia: facelifts, rhinoplasties, lip augmentations, eyebrow adjustments, etc. The automated facial morphing application can identify facial features by extracting landmarks, or features, from an image of the subject's face. For example, an algorithm may analyze the relative position, size, and/or shape of the eyes, nose, cheekbones, and jaw.

It is noted that the mobile device can include a TrueDepth camera. In one example, the TrueDepth camera can be 7-megapixel and have an f/2.2 aperture. The mobile device system can implement face detection and HDR.

FIG. 1 schematically depicts an example process 100 for automated facial morphing, according to some embodiments. More specifically, in step 102, process 100 can implement facial landmark detection. In step 104, process 100 can implement facial morphing. In step 106, process 100 can implement model retraining. In step 108, process 100 can implement hair color detection.

Figure 2:
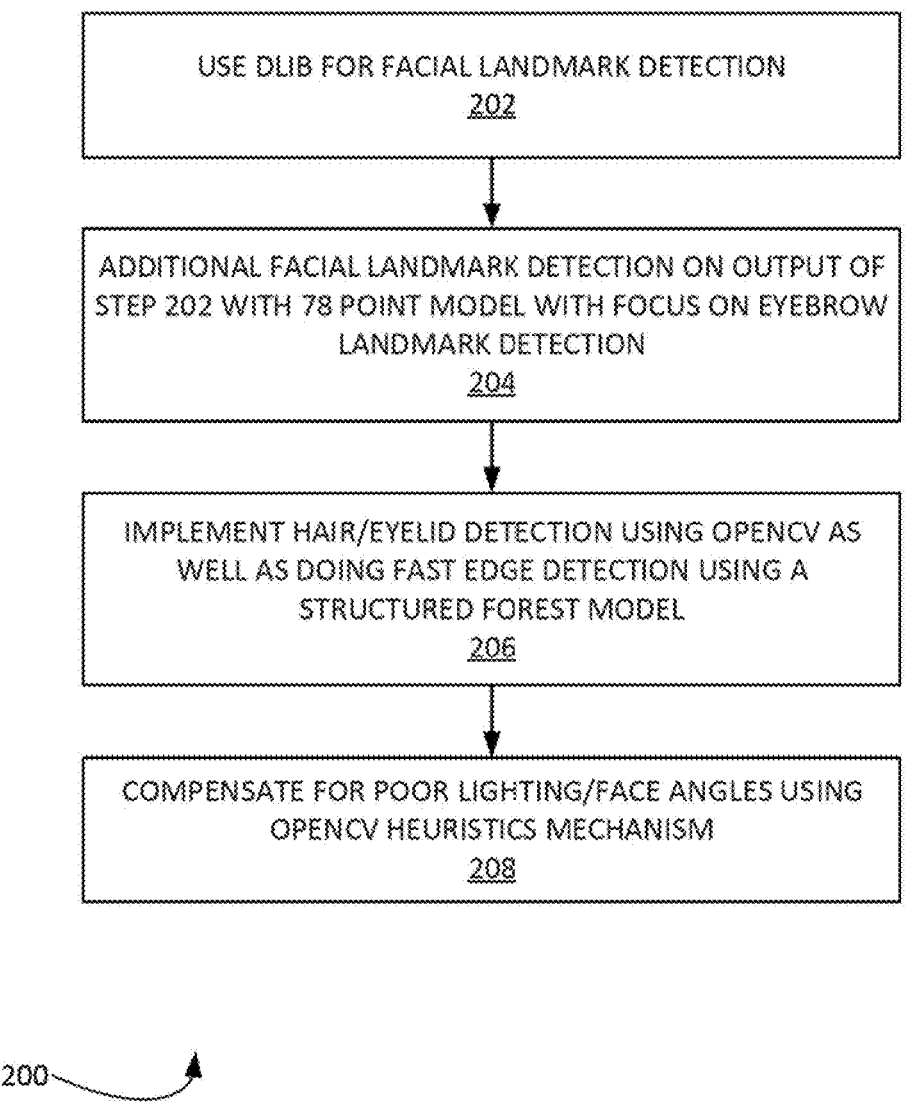
FIG. 2 illustrates an example process for facial landmark detection, according to some embodiments.

FIG. 2 illustrates an example process 200 for facial landmark detection, according to some embodiments. It is noted that facial landmark detection is different from facial recognition in the sense that landmark detection is the process of identifying facial features on a face. In one example, process 100 can use various open source tool (e.g. Dlib, etc.) to do an initial phase of facial landmark detection. However, because of the level of detail that is to be obtained around a specified set of the features, such as: eyebrow, nose and lip detection. Process 200 can generate an n-point model (e.g. seventy-eight (78) point model, eighty-five (85) point model, etc.) that provides a higher resolution on the eyebrow in particular.

More specifically, in step 202, process 200 can use Dlib for facial landmark detection. In step 204, process 200 can use additional facial landmark detection on output of step 202 with a higher resolution seventy-eight (78) point model that focuses on the eyebrow region. In step 206, process 200 can implement hair/eyelid detection using OpenCV as well as doing fast edge detection using a structured forest model. In step 208, process 200 can compensate for poor lighting/face angles using an OpenCV heuristics mechanism. It is noted that in some example embodiments another computer vision library can be used in lieu of OpenCV. Additionally, in some example embodiments, an n-point model other than a seventy-eight (78) point model can be utilized.

Returning to process 100. Process 100 can implement facial morphing by morphing the following areas of the face:

skin, lips, eyebrows, nose, etc. These morphs can be implemented using OpenGL on an iOS device in one example.

Process 100 can implement model retraining. Process 100 can feed production images back into the model. This can enable process 100 to retrain the model periodically and improve the detection of facial landmark features on a wider variety of user segments (e.g. various ages, ethnicities, lighting, etc.). It is noted that process 100 can be modified to detect if the user is wearing glasses as well.

Figure 3:
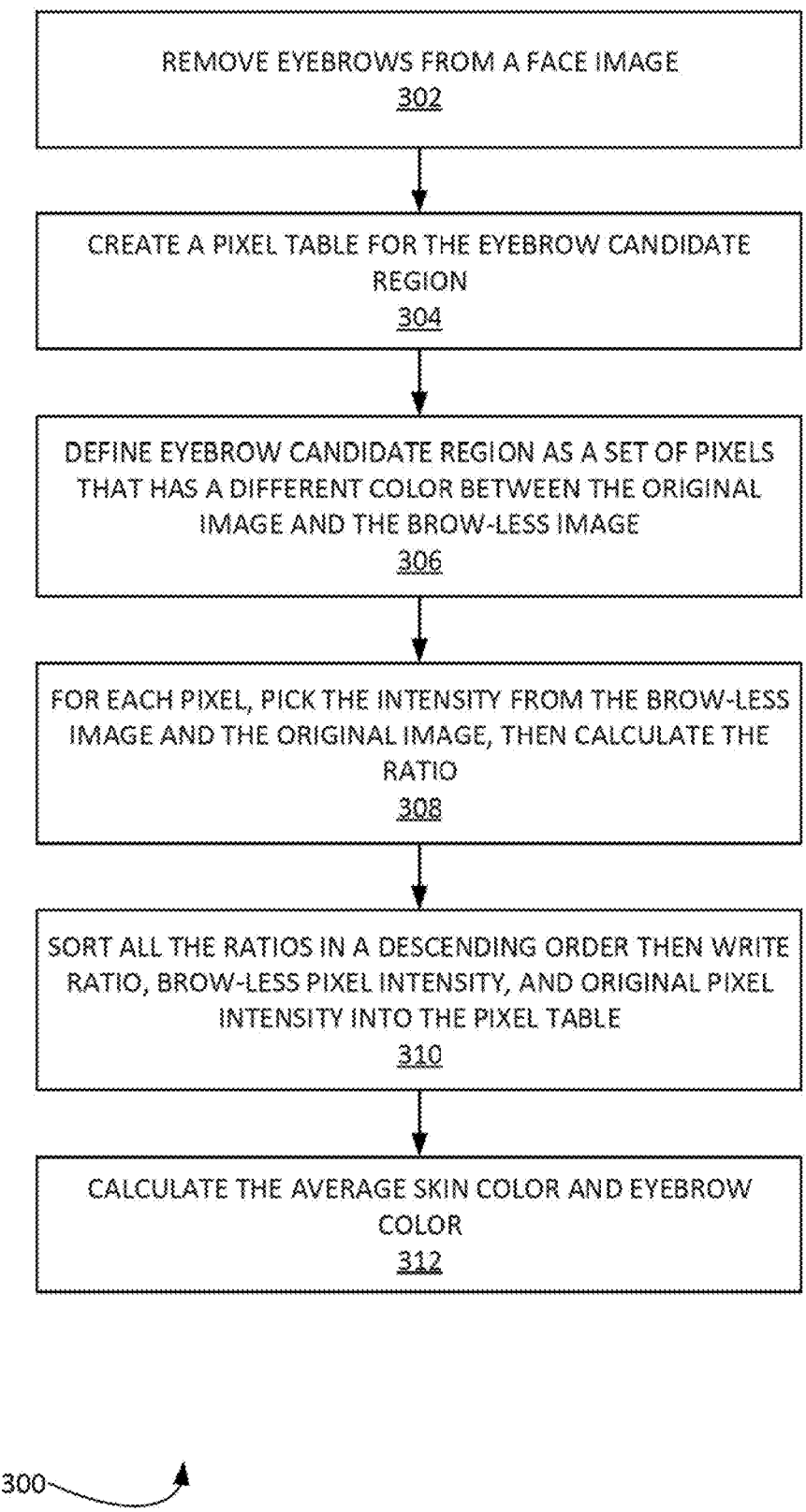
FIG. 3 illustrates an example process for hair-color detection, according to some embodiments.

FIG. 3 illustrates an example process for hair-color detection, according to some embodiments. In step 302, process 300 can remove eyebrows from a face image. The output of step 302 is the digital image used to detect the eyebrow color. The output of step 302 is the digital image used for eyebrow deformation and translation.

In step 304, process 300 can create a pixel table for the eyebrow candidate region.

In step 306, process 300 can define eyebrow candidate region as a set of pixels that has a different color between the original image and the brow-less image.

In step 308, process 300 can, for each pixel, pick the intensity from the brow-less image and the original image, then calculate the ratio. This can be calculated using (brow-less pixel intensity/original pixel intensity).

In step 310, process 300 can sort all the ratios in a descending order then write ratio, brow-less pixel intensity, and original pixel intensity into the pixel table. The descending order can be based on darker pixels in the original image coming first.

In step 312, process 300 can calculate the average skin color and eyebrow color. The range of brow color in the table is defined as the pixels between the start of the table (e.g. has the largest intensity ratio) and the pixel that has an eighty percent (80%) ratio. The skin color is defined as the mean of the brow-less pixels in the range. The brow color is defined as the mean of the original pixels in the range.

Example User Interfaces

Figure 4:
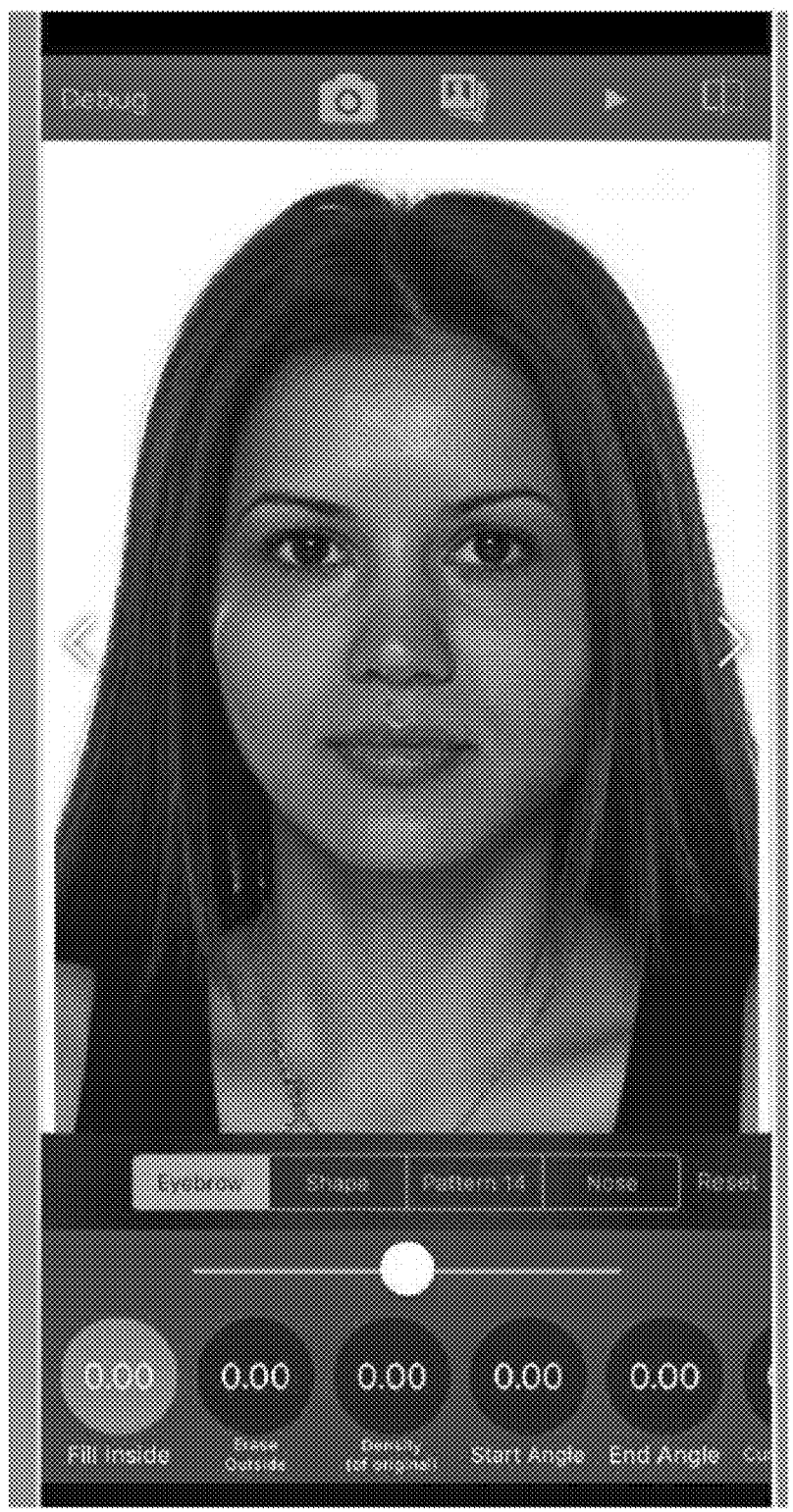
FIGS. 4-7 illustrates graphical user interfaces showing a mobile application used for automated facial morphing.
Figure 5:
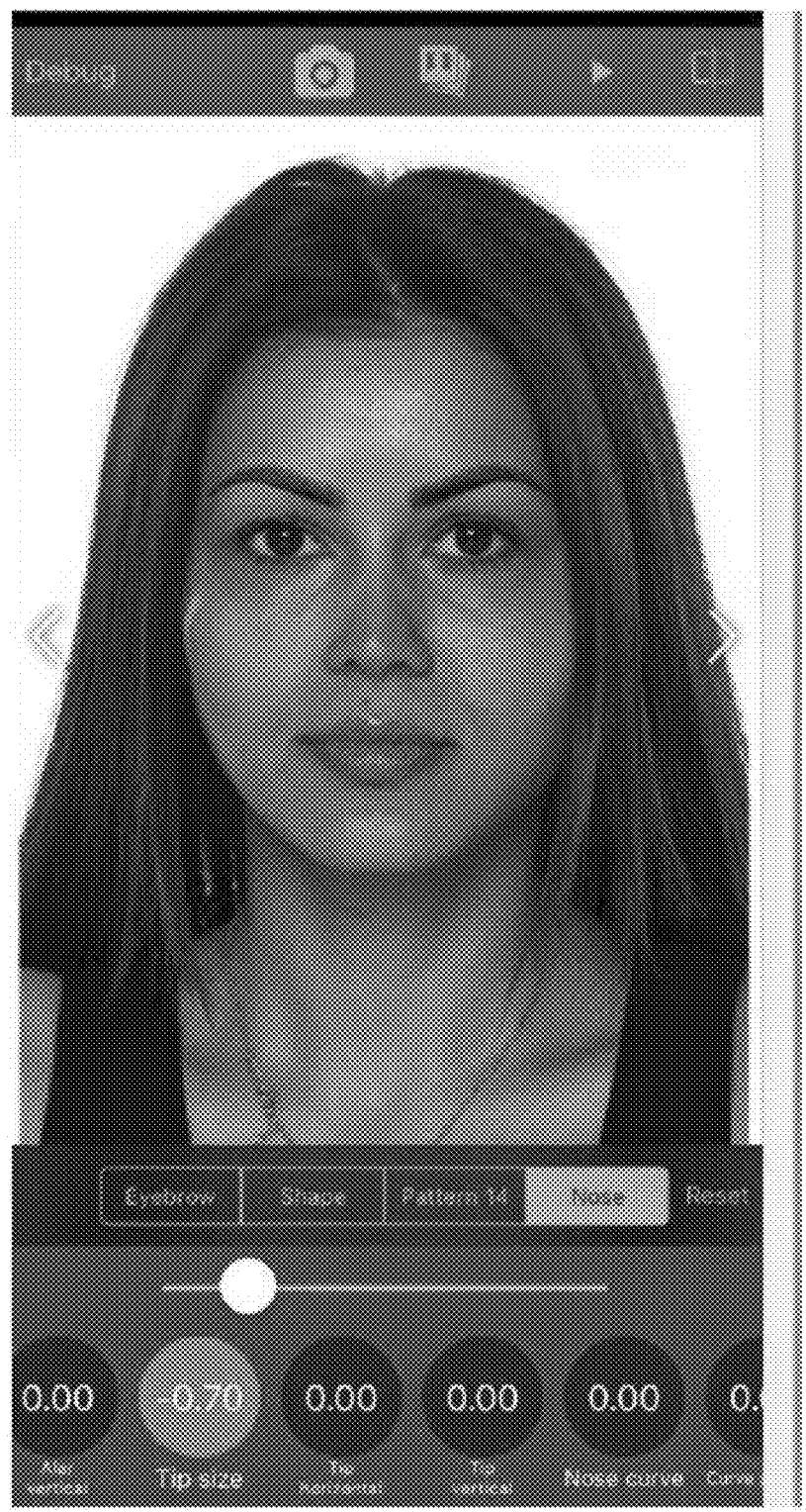
Figure 6:
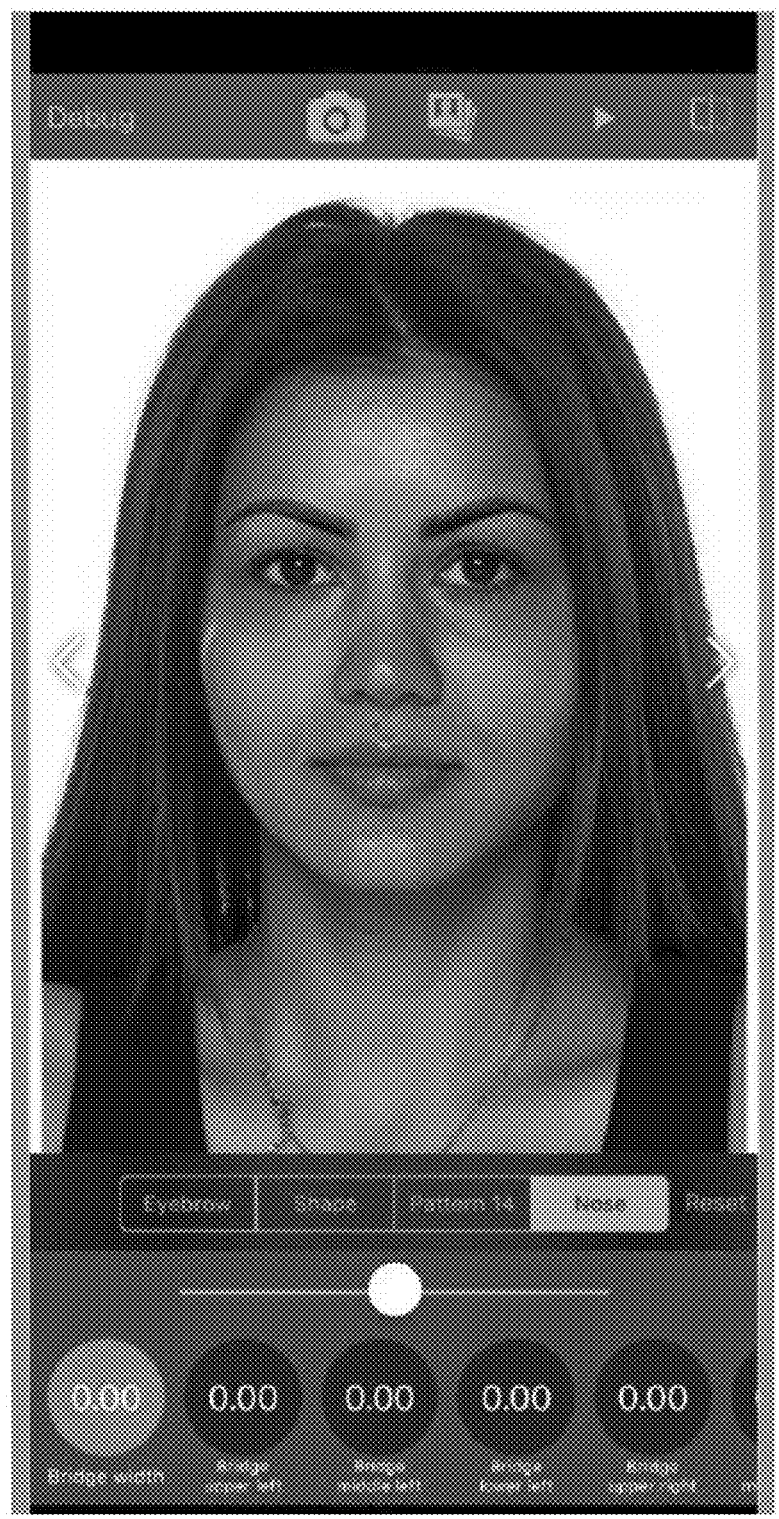

FIGS. 4-7 illustrates graphical user interfaces showing a mobile application used for automated facial morphing. FIG. 4 illustrates an in-application image of a user. The user can use the application to morph the shape of the nose, eyebrows, etc. FIG. 5 illustrates an in-application image of the user with an applied eyebrow morph. FIG. 6 illustrates an in-application image of the user with a reduced nose tip size. The dark overlay indicates where the morphed eyebrow is to be drawn.

Figure 7:
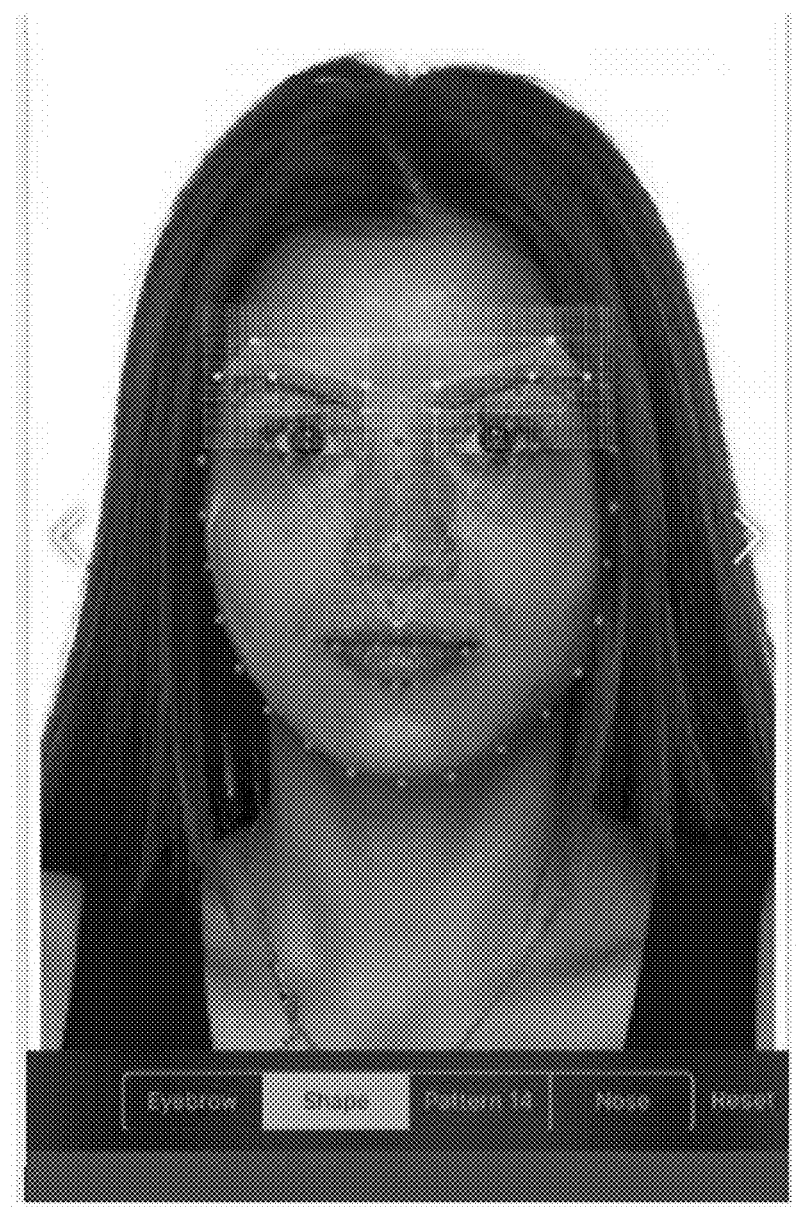

FIG. 7 illustrates an in-application image of a user with various meshes overlaying the user's face. The pink mesh represents various regions (e.g. eyebrow region, etc.). The grid points are the facial landmark detection points discussed supra. The facial landmark detection is used to detect the eyes, the eyebrows, the nose, the lips, the jawline, etc. The green region is the region to draw an idealized eyebrow morph.

Example Computing Systems

Figure 8:
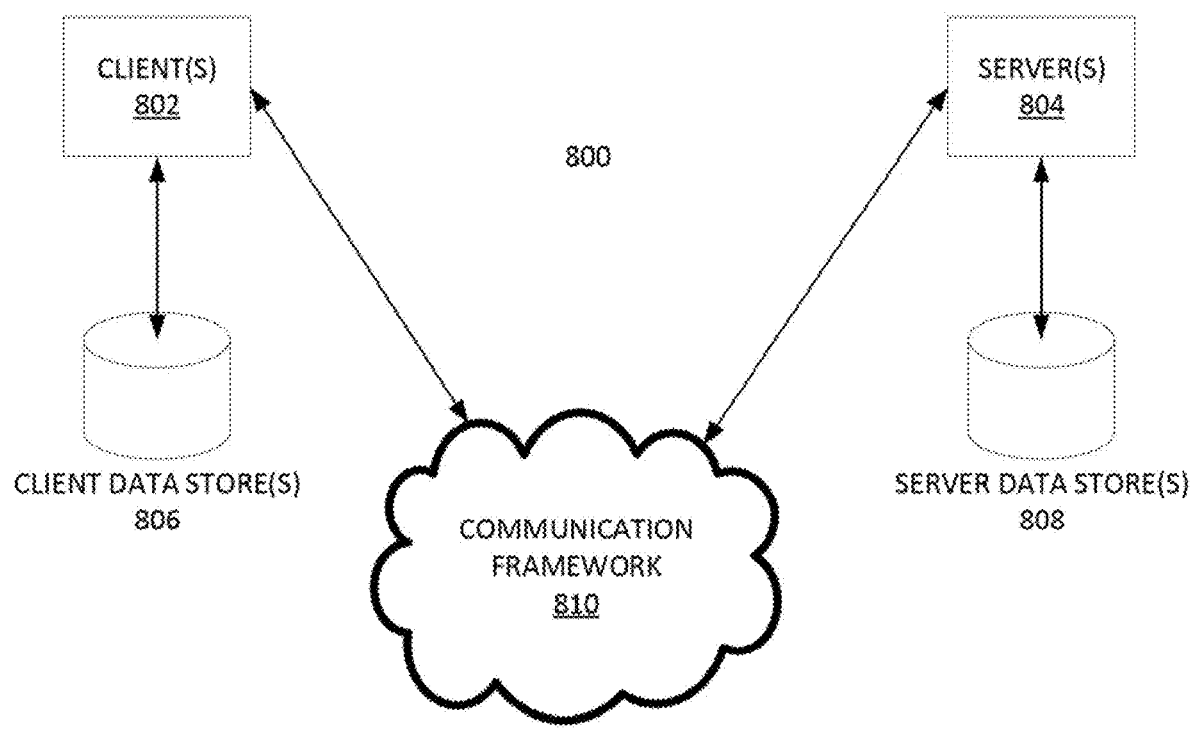
FIG. 8 is a block diagram of a sample computing environment that can be utilized to implement some embodiments.

FIG. 8 is a block diagram of a sample computing environment 800 that can be utilized to implement some embodiments. The system 800 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 may be in the form of a data packet adapted to be transmitted between two or more computer processes. The system 800 includes a communication framework 810 that can be employed to facilitate communications between the client(s) 802 and the server(s) 804. The client(s) 802 are connected to one or more client data store(s) 806 that can be employed to store information local to the client(s) 802. Similarly, the server(s) 804 are connected to one or more server data store(s) 808 that can be employed to store information local to the server(s) 804.

Figure 9:
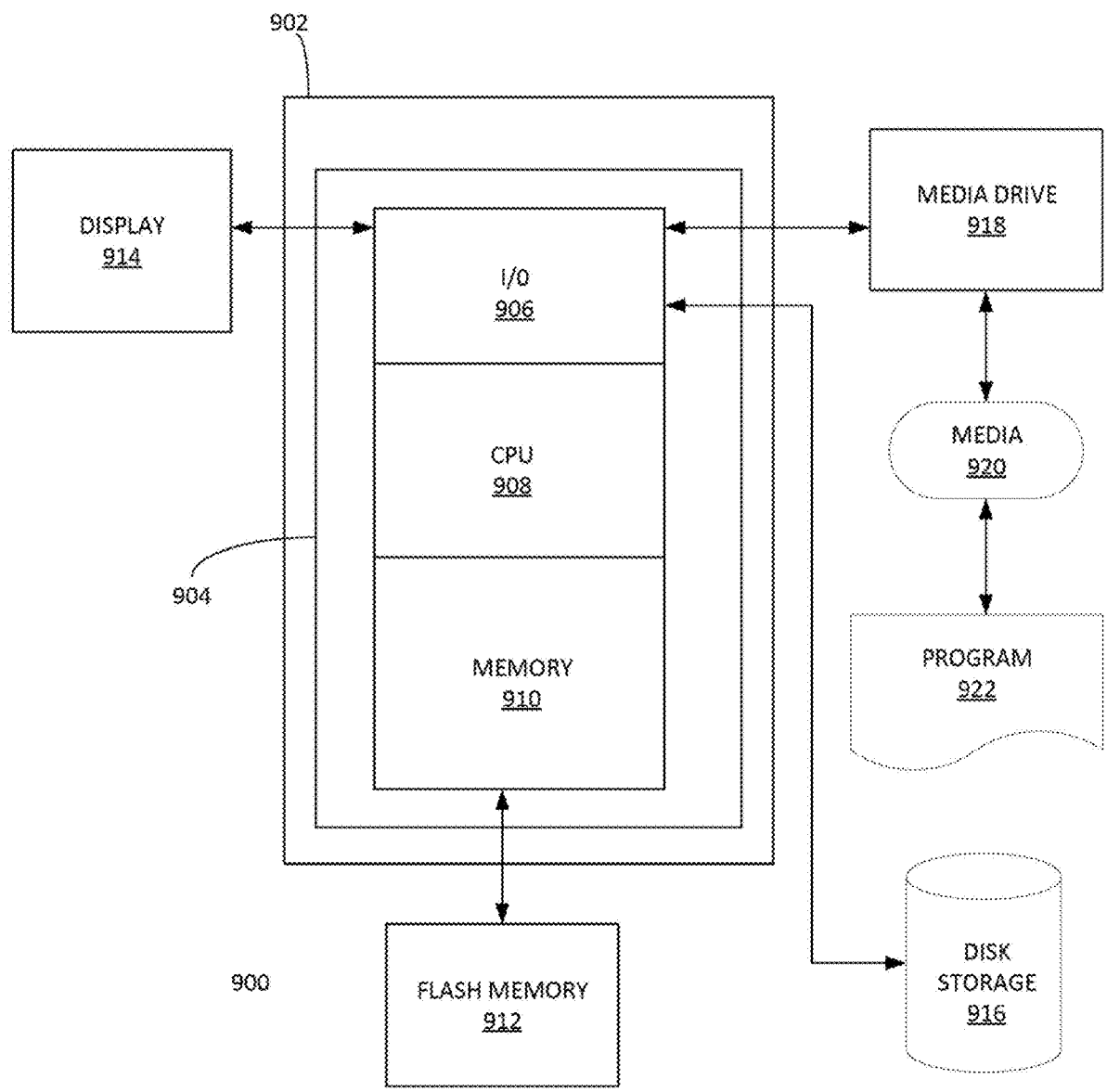
FIG. 9 depicts an exemplary computing system that can be configured to perform any one of the processes provided herein.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. In another example, computing system 900 can be configured as a mobile device and include such systems as may be typically included in a mobile device such as GPS systems, gyroscope, accelerometers, cameras, etc.

3D Image Generation

Figure 10:
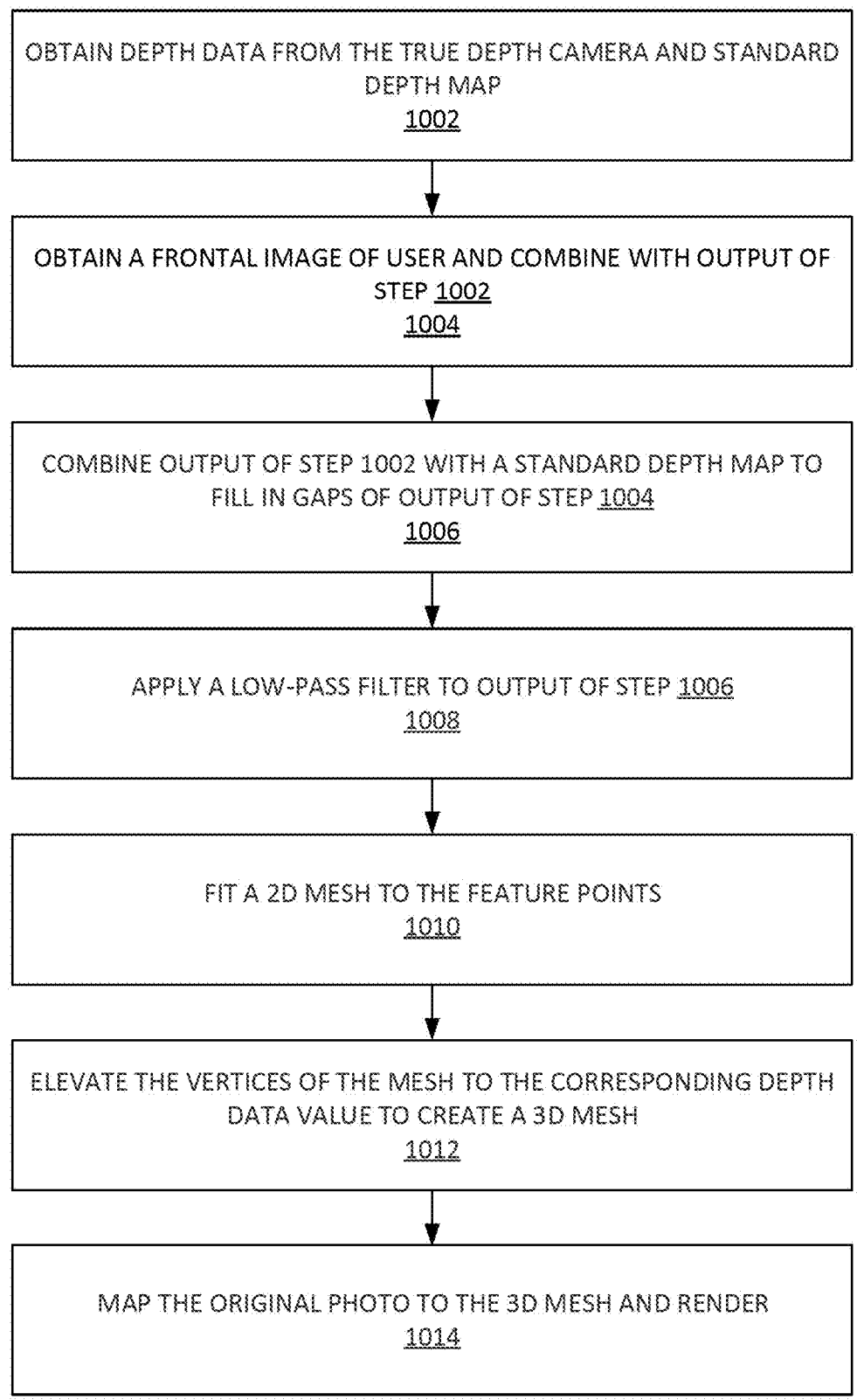
FIG. 10 illustrates an example process for generating a 3D image of a user's head from a 2D digital image, according to some embodiments.

FIG. 10 illustrates an example process 1000 for generating a 3D image of a user's head from a 2D digital image, according to some embodiments. The 2D digital image and other data used by process 1000 can be obtain from a mobile device (e.g. an iPhone X with a TrueDepth camera, etc.).

In step 1002, process 1000 can obtain depth data from the true depth camera and standard depth map. In step 1004, process 1000 can obtain a frontal image of user and combine with output of step 1002. In step 1006, process 1000 can combine output of step 1002 with a standard depth map to fill in gaps of output of step 1004. In step 1008, process 1000 can apply a low-pass filter to output of step 1006. In step 1010, process 1000 can fit a 2D mesh to the feature points. In step 1012, process 1000 can elevate the vertices of the mesh to the corresponding depth data value to create a 3D mesh. In step 1014, process 1000 can map the original photo to the 3d mesh and render.

In one example, process 1000 can obtain a front image. Process 1000 can obtain a set of depth image(s) from a TrueDepth camera. Process 1000 can detect errors. The TrueDepth camera can be included in the SDK of the mobile device. TrueDepth camera can include a front-facing "selfie" camera. The TrueDepth camera can include an infrared emitter (e.g. projects over 30,000 dots in a known pattern onto the user's face). These dots can be obtained by a dedicated infrared camera for analysis. The TrueDepth camera system can include a proximity sensor to determine when a user is close enough to activate. An ambient light sensor can also be included to provide output light levels.

Process 1000 can implement interpolation. Process 1000 can introduce a human depth model (a standardized depth model). This can sit behind the depth model from the error detection step. Process 1000 can apply a filter to obtain the 3D images. Process 1000 can provide interpolation with a real-world model to correct stretch marks on side of digital image of the user's face. Process 1000 can remove rigid areas.

Figure 11:
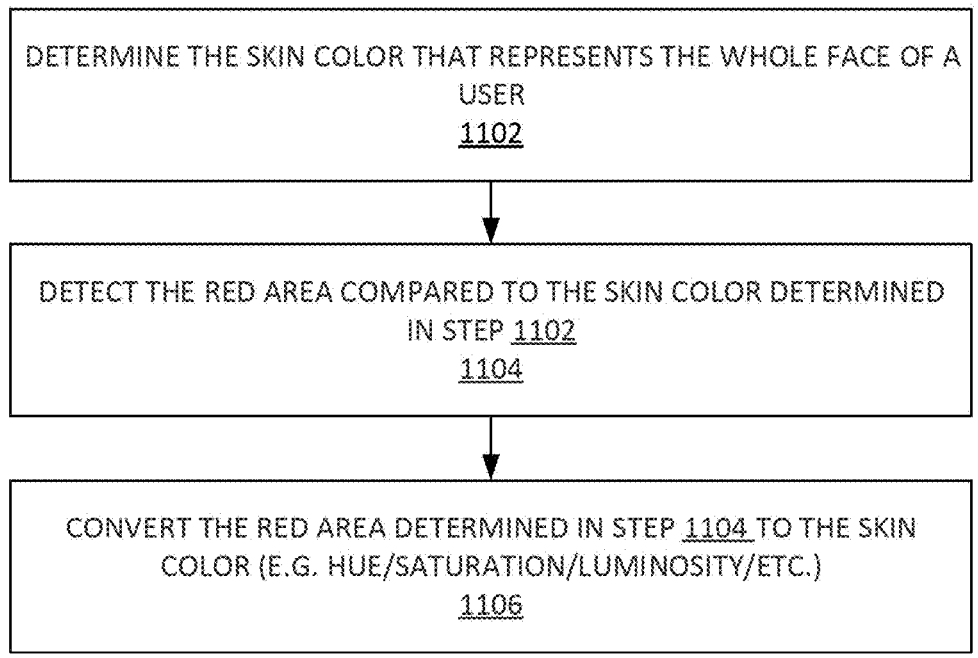
FIG. 11 illustrates an example process for removing acne effects from a digital image of a user, according to some embodiments.

FIG. 11 illustrates an example process 1100 for removing acne effects from a digital image of a user, according to some embodiments. Process 1100 can be used to remove the redness in a digital image of a user's face that is associated with acne.

In step 1102, process 1100 can determine the skin color that represents the whole face. IN step 1104, process 1100 can detect the red area compare to the skin color. In step 1106, process 1100 can convert the area of step 1104 to the skin color (e.g. same hue/sat/lum/etc.).

Figure 12:
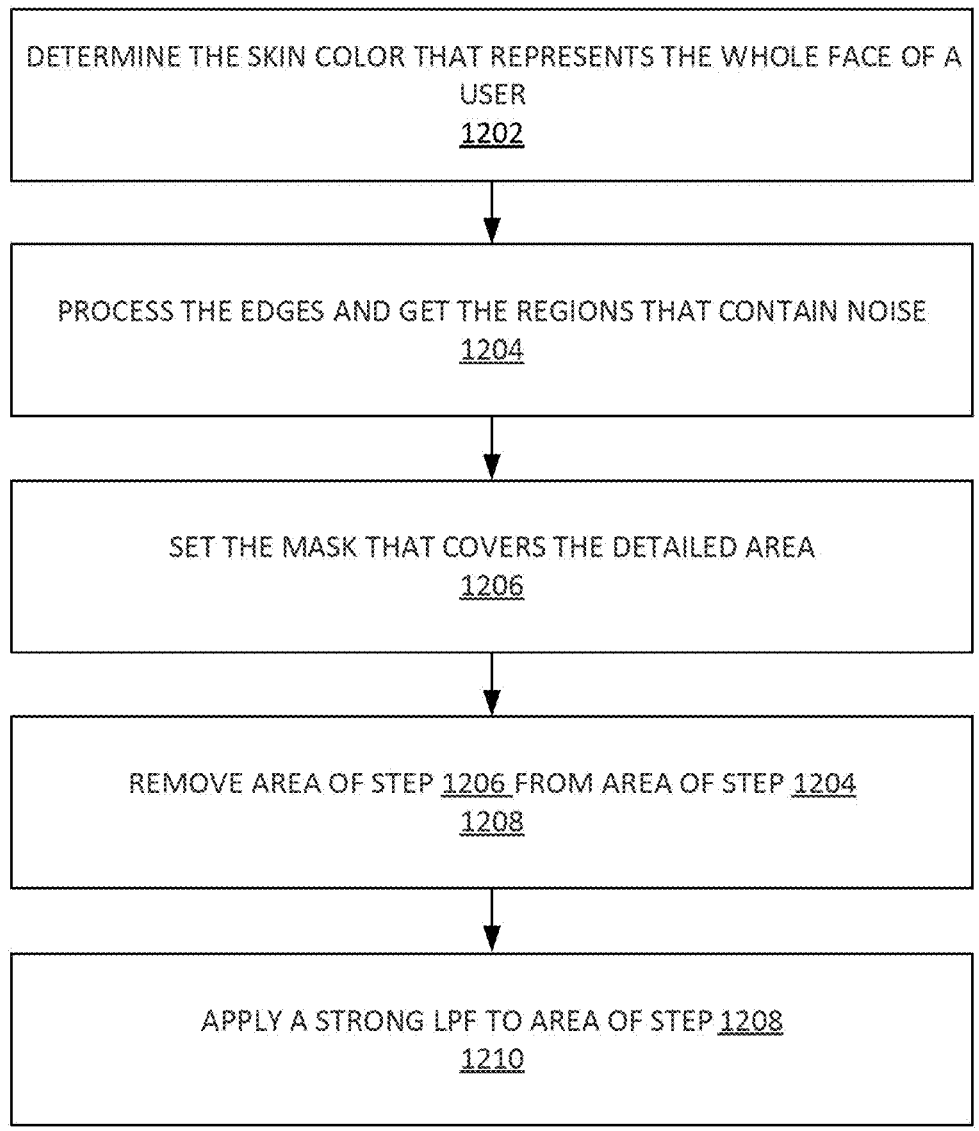
FIG. 12 illustrates an example process for smoothing skin effects in a digital image, according to some embodiments.
Figure 13:
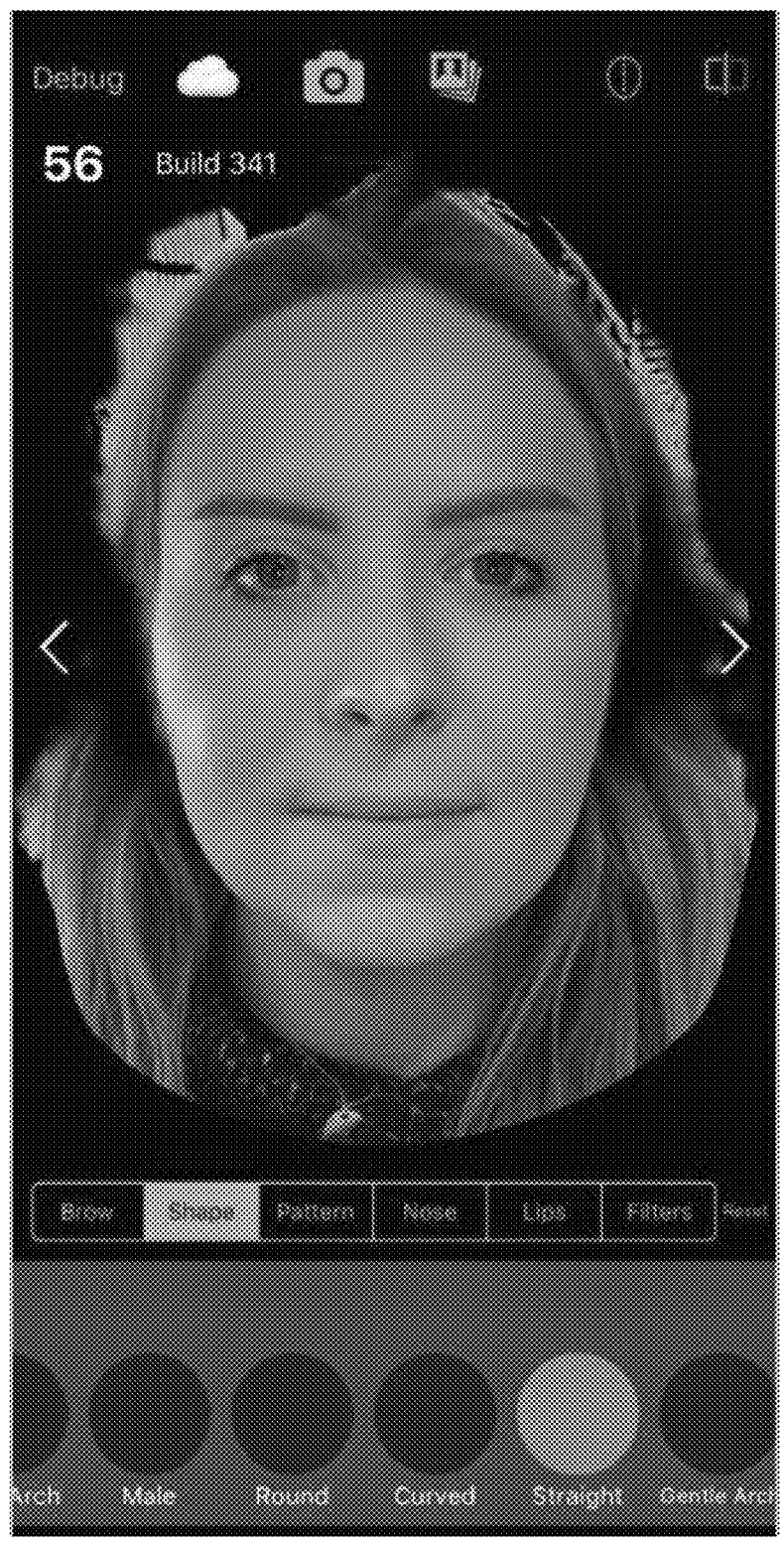
FIGS. 13-17 illustrates example graphical user interfaces showing a mobile application used for automated facial morphing for eyebrow hair and face color detection, according to some embodiments.
Figure 14:
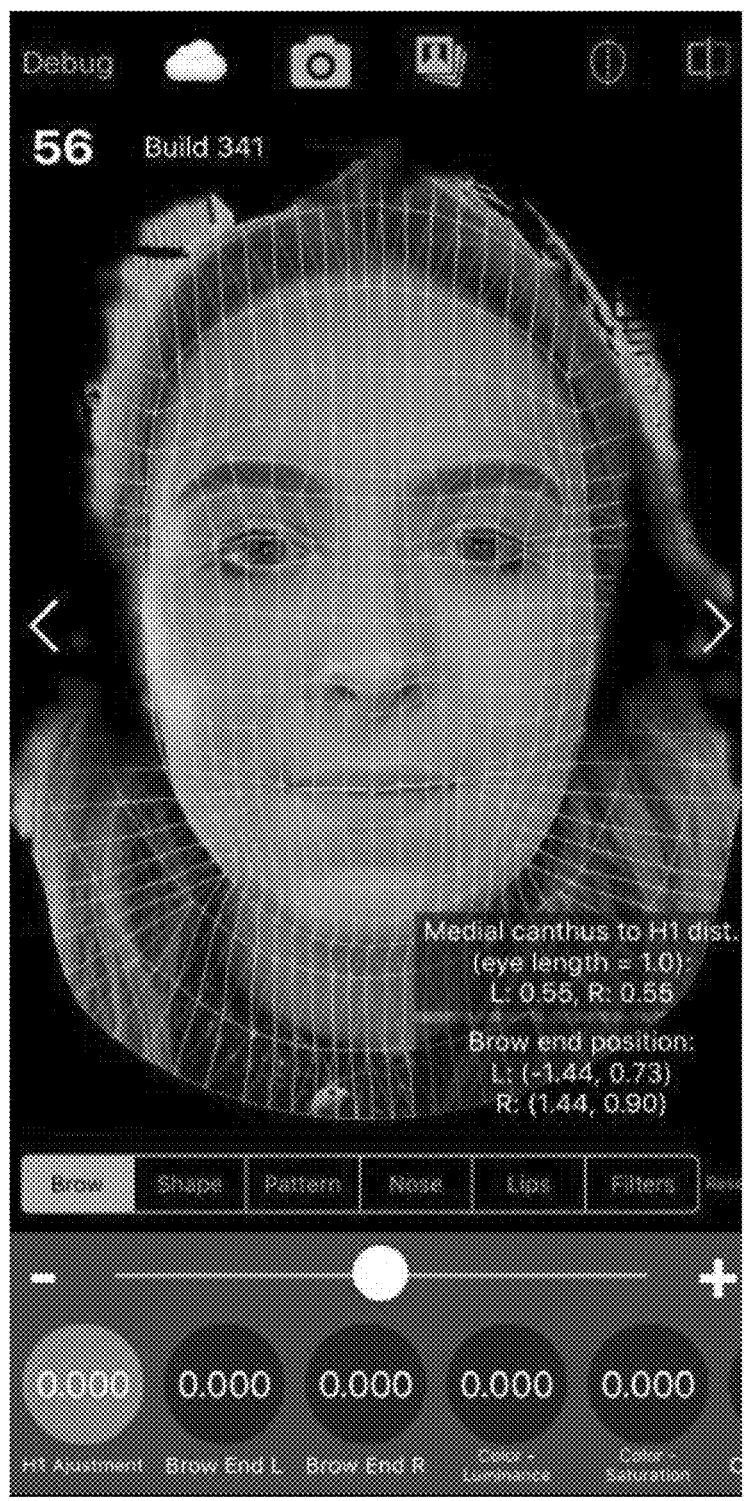
Figure 15:
Figure 16:
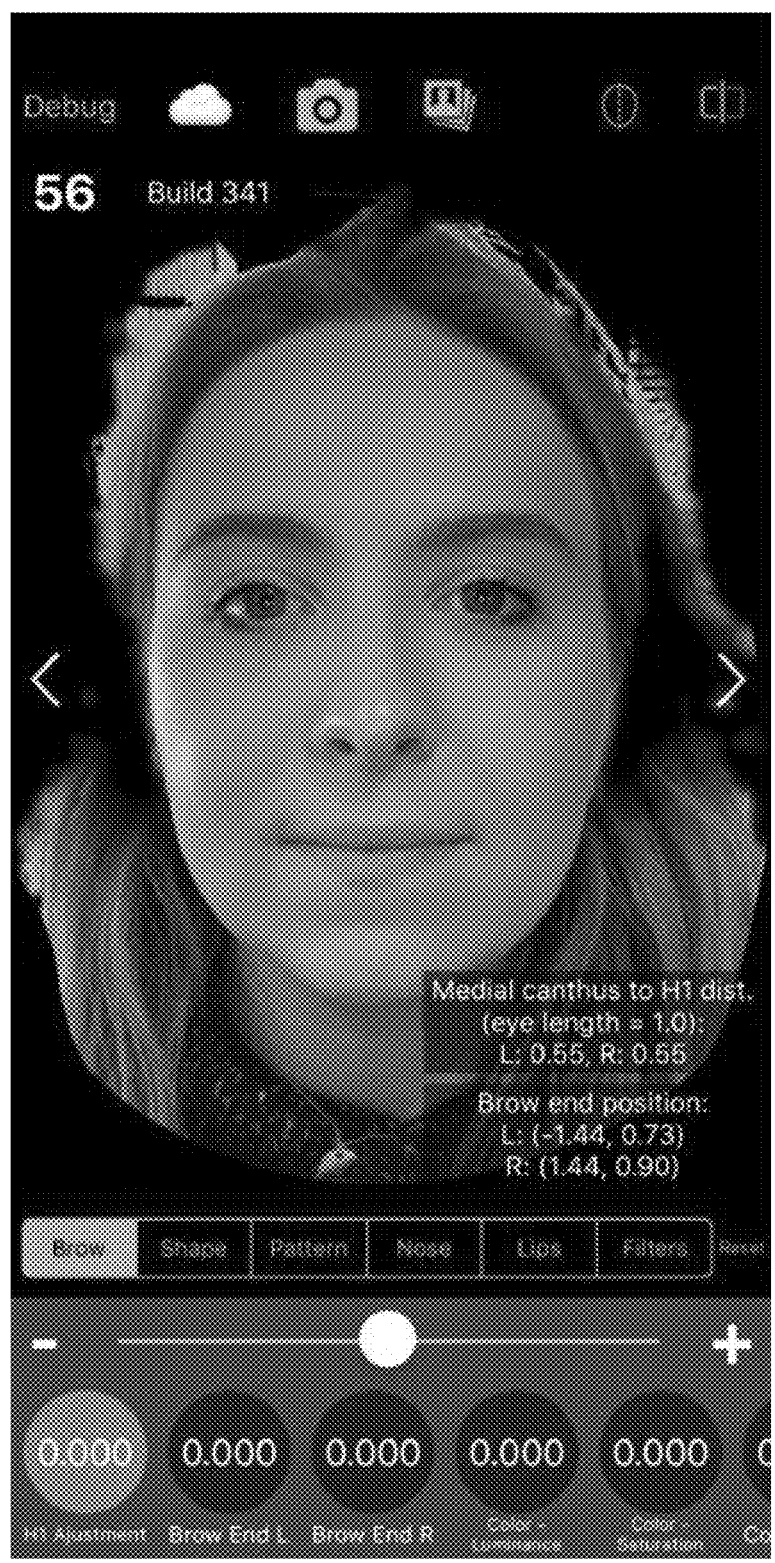
Figure 17:
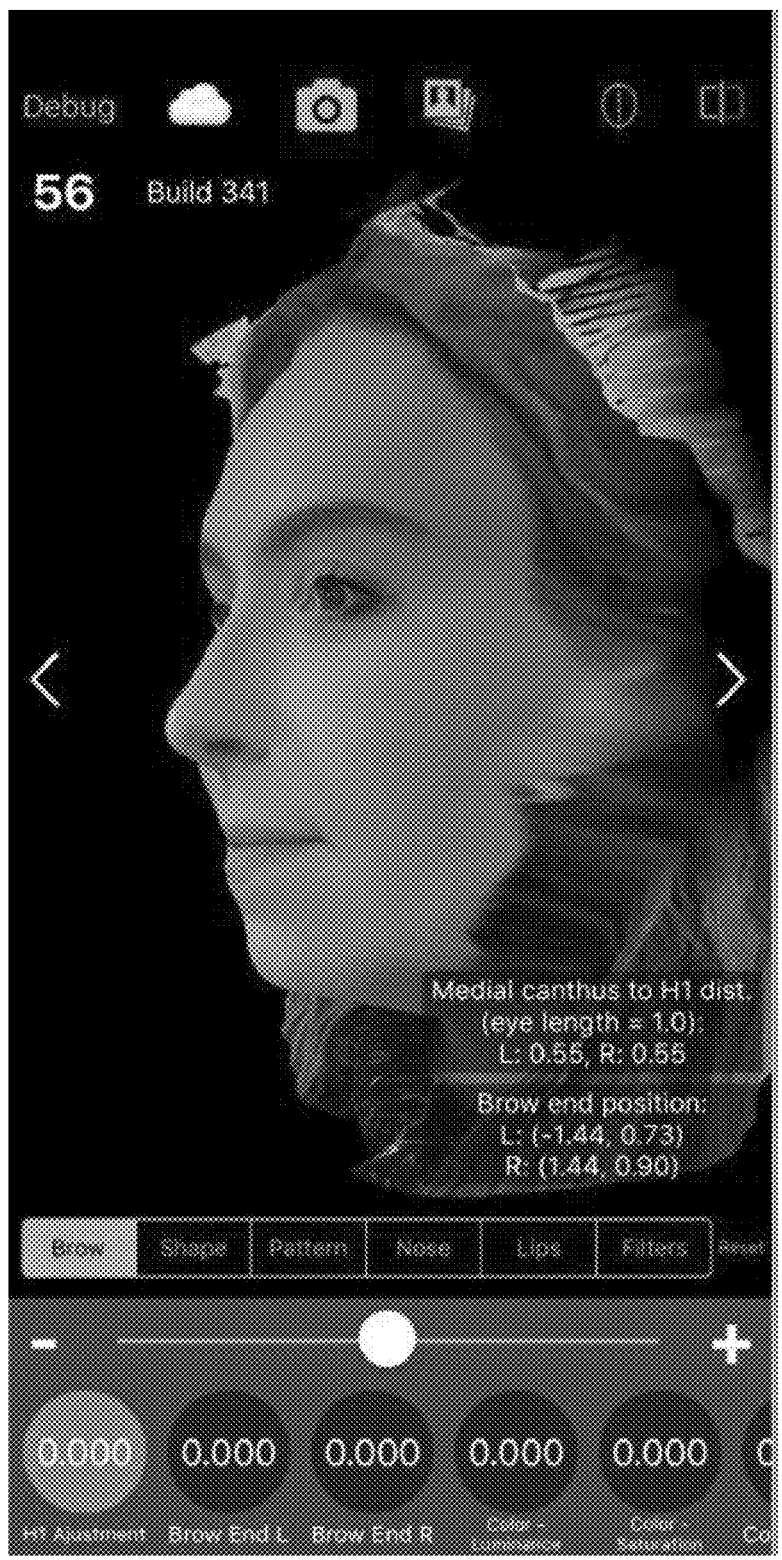

FIG. 12 illustrates an example process 1200 for smoothing skin effects in a digital image, according to some embodiments. Process 1200 can be used to smooth skin effects of a user's face in a digital image.

In step 1202, process 1200 can detect edges from a black and white digital image. The black and white digital image can be of a user's face. In step 1204, process 1200 can process the edges and get the regions that contain noise. In step 1206, process 1200 can set the mask that covers the detailed area (e.g. eyes, nose, and mouth). In step 1208, process 1200 can remove area of step 1206 from area of step 1204. In step 1210, process 1200 can apply a strong LPF to the area of step 1208.

Additional Example User Interfaces

FIGS. 13-17 illustrates example graphical user interfaces 1300-1700 showing a mobile application used for automated facial morphing for eyebrow hair and face color detection, according to some embodiments. FIGS. 13-17 illustrate 3D reconstruction of point cloud data; eyebrows in 2D and 3D space; example eyebrow styles; eyebrow and lips examples with a straight on view and from a sideview; different eyebrow styles; etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method useful for automated facial morphing for eyebrow hair and face color detection comprising:
    obtaining a face image, wherein the face image comprises a digital image of a frontal view of a user's face;
    identifying a pair of eyebrows in the face image;
    generating a brow-less image of the face image by removing the pair of eyebrows from the face image;
    with a digital image of the removed pair of eyebrows, detecting the eyebrow color;
    creating a pixel table for an eyebrow candidate region;
    defining the eyebrow candidate region as a set of pixels with a different color between the eyebrow color and a brow-less image color;
    for each pixel in the set of pixels:
        determine an intensity value of the brow-less image and another intensity value of the face image, and
        calculating a ratio of the intensity value of the brow-less image and another intensity value of the face image;
    sorting all the ratios in a descending order and for each ratio:
        writing the ratio, the intensity value of the brow-less image and the other intensity value of the face image into the pixel table; and
    calculating an average skin color of the face image and an average eyebrow color of the face image.

2. The computerized method of claim 1, wherein the digital image of the removed pair of eyebrows is used for eyebrow deformation and translation.

3. The computerized method of claim 2, wherein the ratio comprises is calculated using: a brow-less pixel intensity/an original pixel intensity.

4. The computerized method of claim 3, wherein the descending order of the pixel table is based on a darker pixel in the face image coming before a lighter pixel.

5. The computerized method of claim 4, wherein a range of eye brow color in the pixel table is defined as the pixels between a start of the pixel table and the pixel that has an eighty percent (80%) ratio value.

6. The computerized method of claim 5, wherein the skin color is defined as a mean of the brow-less pixels in the range.

7. The computerized method of claim 6, wherein the eyebrow color is defined as the mean of the pixels of the face image in the range of the pixels between a start of the pixel table and the pixel that has an eighty percent (80%) ratio value.

8. The computerized method of claim 7, wherein the start of the pixel table has the largest intensity ratio.

9. The computerized method of claim 8, wherein the removing the pair of eyebrows from the face image further comprises:
    identifying a location of the media canthus in each eye of the user's face.

10. The computerized method of claim 9, wherein the removing the pair of eyebrows from the face image further comprises:
    anchoring an eyebrow erasing process to the location of the medial canthus.

* * * * *